(12) United States Patent
Kinsella et al.

(10) Patent No.: US 9,521,151 B2
(45) Date of Patent: Dec. 13, 2016

(54) AUTOMATED AND POLICY DRIVEN OPTIMIZATION OF CLOUD INFRASTRUCTURE THROUGH DELEGATED ACTIONS

(71) Applicant: CloudHealth Technologies, Inc., Boston, MA (US)

(72) Inventors: Joe Kinsella, Reading, MA (US); Andi Abes, Waltham, MA (US)

(73) Assignee: Cloudhealth Technologies, Inc., Boston, MA (US)

( * ) Notice: Subject to any disclaimer, the term of this patent is extended or adjusted under 35 U.S.C. 154(b) by 114 days.

(21) Appl. No.: 14/520,727

(22) Filed: Oct. 22, 2014

(65) Prior Publication Data

US 2016/0119357 A1 Apr. 28, 2016

(51) Int. Cl.
*G06F 21/00* (2013.01)
*H04L 29/06* (2006.01)
*H04L 12/24* (2006.01)
*H04L 29/08* (2006.01)

(52) U.S. Cl.
CPC ......... *H04L 63/102* (2013.01); *H04L 41/0813* (2013.01); *H04L 63/20* (2013.01); *H04L 67/10* (2013.01)

(58) Field of Classification Search
CPC ........ H04L 63/102; H04L 67/10; H04L 63/20; H04L 41/0813
See application file for complete search history.

(56) References Cited

U.S. PATENT DOCUMENTS

| | | |
|---|---|---|
| 6,088,679 A | 7/2000 | Barkley |
| 7,660,743 B1 | 2/2010 | Messa et al. |
| 8,265,980 B2 | 9/2012 | Ochs et al. |
| 8,407,190 B2 | 3/2013 | Prahlad et al. |
| 8,626,115 B2 | 1/2014 | Raleigh et al. |
| 8,626,637 B1 | 1/2014 | Gooch et al. |
| 8,635,158 B1 | 1/2014 | Ledder et al. |
| 8,706,584 B1 | 4/2014 | Forbes, Jr. |
| 8,719,299 B2 | 5/2014 | Voigt et al. |
| 8,813,028 B2 | 8/2014 | Farooqi |
| 8,839,387 B2 | 9/2014 | Raleigh |
| 8,843,302 B2 | 9/2014 | de Blanes et al. |
| 2007/0143686 A1 | 6/2007 | Branson et al. |
| 2007/0156694 A1* | 7/2007 | Lim .................... G06F 21/6218 |
| 2007/0261112 A1 | 11/2007 | Todd et al. |
| 2011/0238458 A1 | 9/2011 | Purcell et al. |
| 2013/0073724 A1* | 3/2013 | Parashar ............... G06F 9/5072 709/224 |
| 2013/0311559 A1 | 11/2013 | Swinson et al. |
| 2014/0040343 A1 | 2/2014 | Nickolov et al. |

OTHER PUBLICATIONS

International Search Report, Jan. 22, 2016.
Written Opinion, Jan. 22, 2016.

* cited by examiner

*Primary Examiner* — Kendall Dolly
(74) *Attorney, Agent, or Firm* — Goodwin Procter LLP

(57) ABSTRACT

A system and method for optimizing a cloud environment using a workflow.

20 Claims, 9 Drawing Sheets

US 9,521,151 B2

AUTOMATED AND POLICY DRIVEN OPTIMIZATION OF CLOUD INFRASTRUCTURE THROUGH DELEGATED ACTIONS

FIELD OF THE INVENTION

Embodiments of the present invention are directed to systems and methods for securely automating recommendations to optimize the cost, availability, performance and security of cloud infrastructure using approval workflow.

BACKGROUND OF THE INVENTION

Cloud computing is characterized by on-demand infrastructure that can be programmatically provisioned and de-provisioned by its users. It has enabled substantial efficiencies in the cost of infrastructure by allowing organizations to provision only what they need for the period of time in which they need it. This has, however, resulted in both an increased complexity and a more rapid pace of change within infrastructure that has necessitated more active management to maintain desired states of cost, security, performance and availability.

In order to maintain a desired state for infrastructure, it is necessary to constantly monitor the current state of infrastructure and regularly tune it to stay within desired operating conditions. Several challenges prevent such a system from existing, including the need for a system in which a user can: define a policy for maintaining a desired state, monitor the cloud environment for any deviation from the desired state, determine the optimum changes to bring an environment back to the desired state, execute user-defined workflow (required to gain approval within an organization for making a change) to achieve the desired state, and acquiring the necessary secure credentials for an automated system to perform the approved change.

Thus, there is a need for systems and methods that can achieve an automated and policy-driven approach to optimize a cloud environment through the use of delegated actions.

BRIEF SUMMARY OF THE INVENTION

In accordance with exemplary embodiments of the present invention, there is provided a computer-implemented, automated, and policy-driven method for optimization of cloud infrastructure through delegated actions using a cloud infrastructure optimization system implementing a computer processor accessing at least one storage medium. The method gathers data from a cloud environment using a monitoring system. The method may use a storage mechanism that has knowledge of a set of policies representing user-desired operation of the cloud environment. The method determines whether a cloud environment should be changed to achieve a more desired state based on at least one user-defined policy. The method produces a recommendation for how to change the cloud environment to achieve at least one desired state, consistent with at least one user-defined policy.

In accordance with an exemplary embodiment of the present invention, there is provided a computer-implemented cloud infrastructure optimization system including at least a computer and a memory. The system comprises a monitoring system that gathers data from a cloud environment. The memory of the system maintains a policy database for storing a set of policies representing user-desired operation of the cloud environment and a set of user-defined policies to authorize a change to the cloud environment. The system may further comprise a policy engine that evaluates whether the cloud environment should be changed to achieve a more desired state based on the policies representing user-desired operation of the cloud environment and the user-defined policies to authorize a change to the cloud environment. The system may also comprise a recommendation engine that produces a recommended change to the cloud environment to achieve at least one desired state consistent with the at least one user-defined policy.

BRIEF DESCRIPTION OF THE DRAWINGS

The present invention is described in detail below with reference to the attached figures, wherein.

DETAILED DESCRIPTION

A cloud environment is characterized as comprising cloud infrastructure and the supporting cloud services that enable this infrastructure. An example of cloud infrastructure may include provisioned computer and storage supporting an application (for example, virtual instances and disks). This virtual infrastructure may exist on physical infrastructure managed by a user or by a third party (for example, a cloud provider). The cloud environment also may include knowledge of the supporting cloud services, such as, the cost, performance, and best practices for making use of the features for the cloud. For example, two clouds may offer a type of virtual instance that delivers the same amount of virtual cores, memory and disk space at an identical price. But actual benchmarking of these virtual instance types may show substantial deviations in price or performance of certain characteristics (for example, instance type for cloud provider A has on average 30% more CPU performance than provider B). Knowledge of this deviation in performance can be important to some optimization recommendations.

Workflow is a series of steps in a business process intended to achieve an outcome. Businesses frequently define workflow for the execution of processes, such as, approving a purchase or authorizing a payment. While some steps in a workflow may be automated, it is common for a workflow to require an active decision by one or more human participants in the process or by an automated system. Workflow may also be dynamic, changing steps based on specific conditions or outcomes from previous steps.

A policy represents a desired state for a cloud environment. The policy may be for a single cloud resource (for example, a virtual instance or a virtual disk), a collection of cloud resources (for example, a production SAP application), or for optimizing across all cloud usage (for example, optimizing costs through the purchase of reserved capacity). The desired state can span a plurality of objectives, such as cost, performance, availability and security. Different organizations may operate their cloud environments based on different policies, with the policies most frequently applied to a like collection of infrastructure (for example, a production SAP application). Within a policy may be one or more explicit or implied trigger conditions. The trigger condition may define when a cloud environment has drifted from a desired state such that it needs to be modified to bring it back within the policy. A sample policy may be: for an organization to manage their search clusters to 99.9% availability, they must ensure the clusters are configured and operated to: a) keep a replica of the data on one other server in the cluster, and b) not run the servers containing the primary and replica data in the same data center (to ensure redundancy of network connectivity and power).

Figure 1:
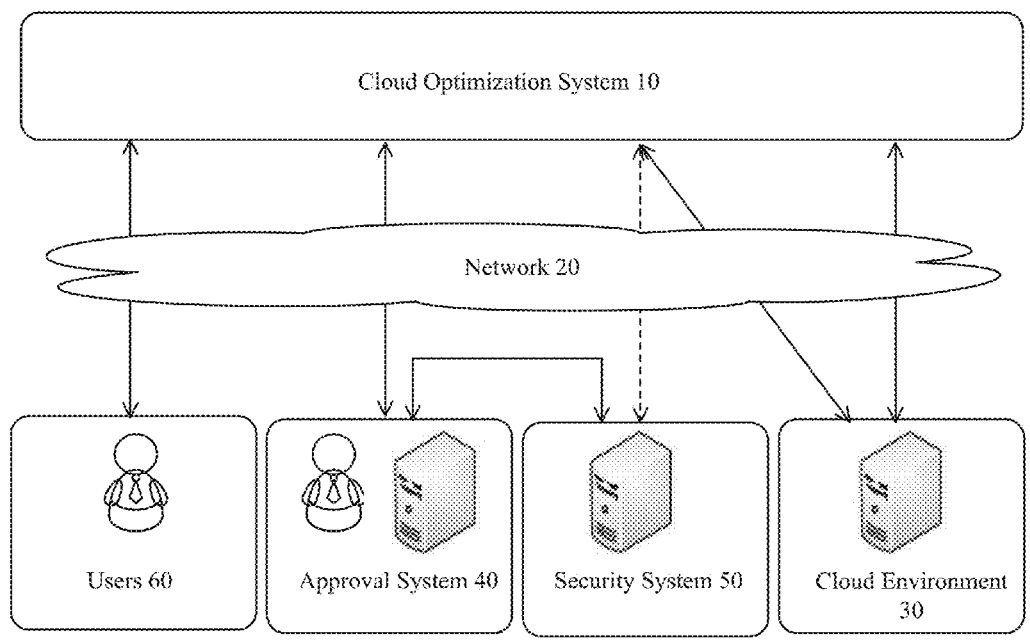
FIG. 1 is a block diagram illustrating an operating environment for a cloud infrastructure optimization system in accordance with an embodiment of the invention.

FIG. 1 is a block diagram illustrating an operating environment for a cloud infrastructure optimization system in accordance with an embodiment of the invention. The Cloud Optimization System 10 may be connected through a communication medium over a Network 20, such as the internet, an intranet, a local-area-network (LAN), a wide-area-network (WAN), etc., to a customer's Cloud Environment 30, Security System 50 (optional), Approval System 40, and Users 60. Users 60 may interface through a Graphical User Interface (GUI) to the Cloud Optimization System (10) to provide the system one or more policies and the necessary workflow(s) to achieve approval for changes required to maintain these policies. The Cloud Optimization System 10 may collect data from the Cloud Environment 30 that includes data from the running infrastructure and optionally the supporting services of the cloud provider. The Cloud Environment 30 may span a plurality of cloud environments, including public, private and hybrid cloud environments. The Cloud Optimization System 10 may store this data for use of historical data in identifying deviations from a policy and making recommendations to achieve a desired state. When the Cloud Optimization System 10 identifies deviation from a desired state, it may produce a recommended change. The Cloud Optimization System 10 may then seek approval to execute this change from the Approval System 40. The Approval System 40 may include an automated system for approving or rejecting the proposed change. In an embodiment of the invention, the Approval System 40 may seek approval from one or more human approvers who perform actions such as approving or rejecting the proposed change. Once a change completes the approval workflow, the Cloud Optimization System 10 may need security credentials to execute the proposed change.

For example, for security reasons, if the Cloud Optimization System 10 has not been granted the necessary privileges to take the set of operations required to optimize Cloud Environment 30 based on all defined policies, the Cloud Optimization 10 may receive one or more credentials to execute an action from an external actor or system. The approval may be achieved by Approval System 40 supplying the necessary credentials. In an embodiment of the invention, the approval may be achieved by the Cloud Optimization System 10 interfacing directly with the Security System 50. Once approval has been achieved and the necessary security credentials procured by the Cloud Optimization System 10, it may then apply these changes directly to the Cloud Environment 30. The Graphical User Interface for the Cloud Optimization System for use by Users 60 and Approval System 40 may include a web-based interface, a desktop application, tablet application, or mobile application, etc. The Cloud Optimization System 10 may be managed by a third party organization independent of the one responsible for the Cloud Environment 30. The Cloud Environment 30 and the Security System 50 may also be services provided by a third party cloud provider (for example, Amazon Web Services). Users 60 and the Approval System 40 may involve actors or systems from more than one organization.

A security system authenticates and authorizes actions performed by actors, human users or other systems. The system may support the grant of temporary security credentials, which, for example, provide privileges to perform one or more actions during a restricted period of time. The security system may automatically expire these temporary security credentials without human intervention based on one or more defined conditions (for example, the elapse of a predetermined time). A user or system may prove their identity using one set of credentials, and if policies are in place to allow it, they are provided a new set of credentials with elevated privileges. In cases where non-repudiation is required, a time-based token may be used for the initial authentication (for example, Internet Engineering Task Force standard RFC 6238). This may provide an alternative to traditional role-based authentication where users and systems are granted the maximum privileges they require for a sustained duration of time. Temporary security authorization allows temporary credentials to be created as required, with privileges scoped just to the task at hand. They may be granted either through human or automated means (for example, by meeting pre-defined conditions), and provide non-repudiation to the overall system.

Figure 2A:
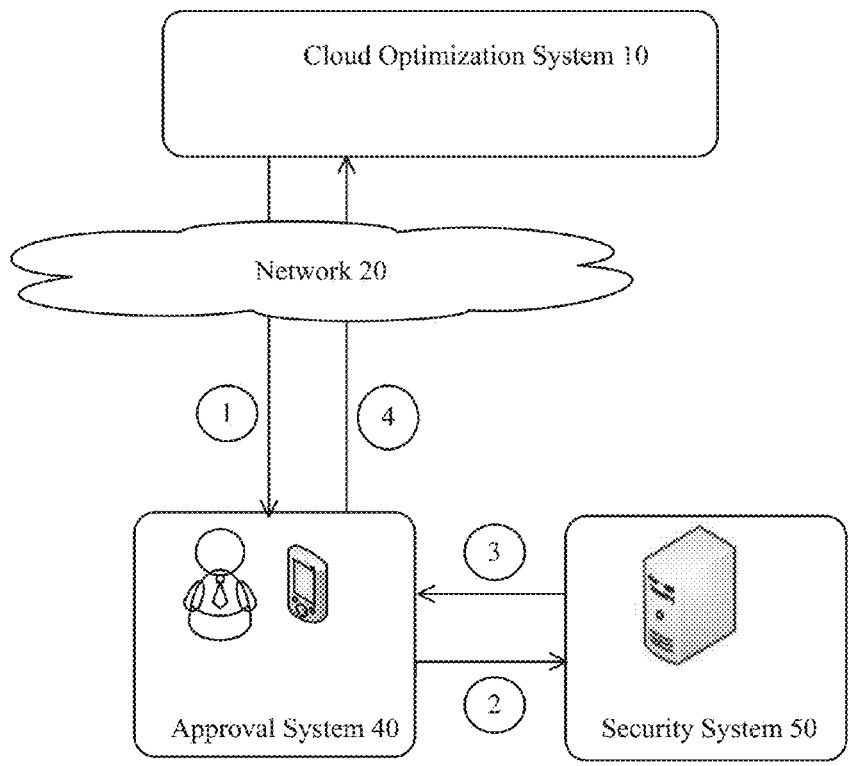
FIGS. 2A and 2B are block diagrams illustrating a method by which a cloud optimization system can obtain the necessary credentials to perform changes to a cloud environment by direct interface between the approval and security systems.
Figure 2B:
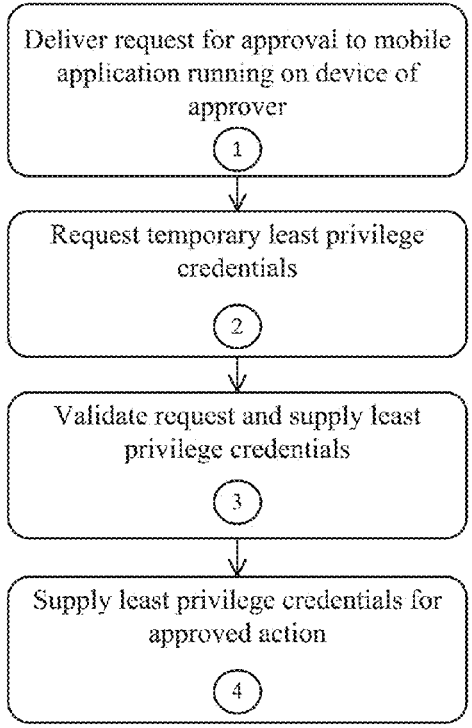

FIGS. 2A and 2B are block diagrams illustrating a method by which a cloud optimization system may obtain the necessary credentials to perform changes to a cloud environment by direct interface between the approval and security systems. In an embodiment of the invention, a requesting user at an Approval System 40 may use a mobile device to interface with a Cloud Optimization System 10. The requesting user may accept or deny the requested action to modify a cloud environment. In Step 1, a Cloud Optimization System 10 may submit a request to one or more approvers through a mobile device application. If the one or more approvers approve the requested action, in Step 2, the mobile device application may submit a request to Security System 50 for temporary least privilege credentials to perform the requested action. In an embodiment, the need for interfacing with Security System 50 may be driven by a desire of an organization to limit the running privileges provided to the Cloud Optimization System 10. In an embodiment of the invention, to provide on-demand, temporary and least privilege credentials in response to a request, the Security System 50 may authorize that the mobile device and its assigned user are authorized to request the proposed temporary credentials, and that these credentials do not violate any pre-defined organizational policies. In Step 3, the Security System 50 may then provide temporary credentials to the user in the Approval System 40 through the mobile device application. The Approval System 40, in Step 4, may then submit the temporary credentials to the Cloud Optimization System 10 for use in performing actions to modify a cloud environment to achieve a desired state. The interface between Cloud Optimization System 10 and Approval System 40 may include any means of communication known to one skilled in the art, such as a web-based application, mobile application, desktop application, email, an automated phone system, text message and chat messaging. An exchange between Approval System 40 and Security System 50 may not be required at all in some cases (for example, if a human actor is requested to type in previously provisioned credentials from memory).

Figure 3A:
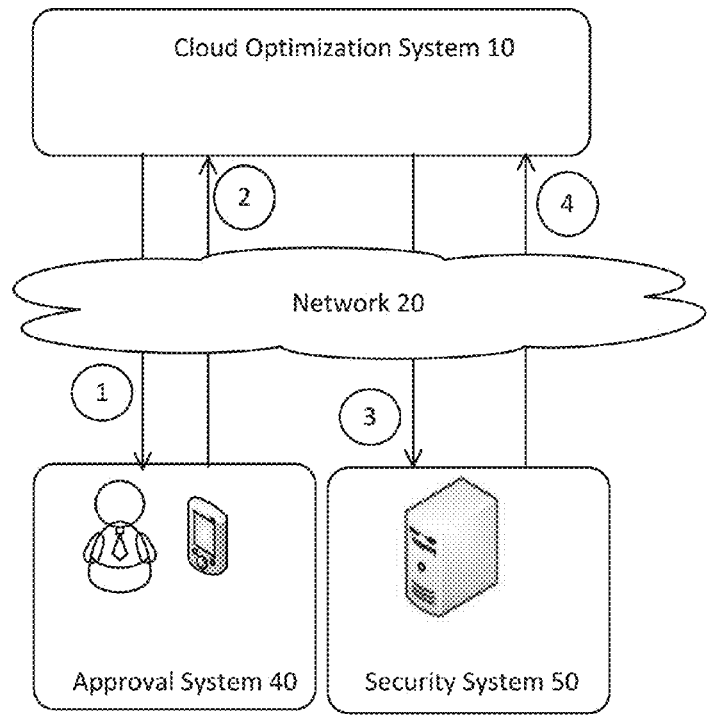
FIGS. 3A and 3B are block diagrams illustrating a method by which a cloud optimization system can obtain the necessary credentials to perform changes to a cloud environment using a broker between the approval and security systems.
Figure 3B:
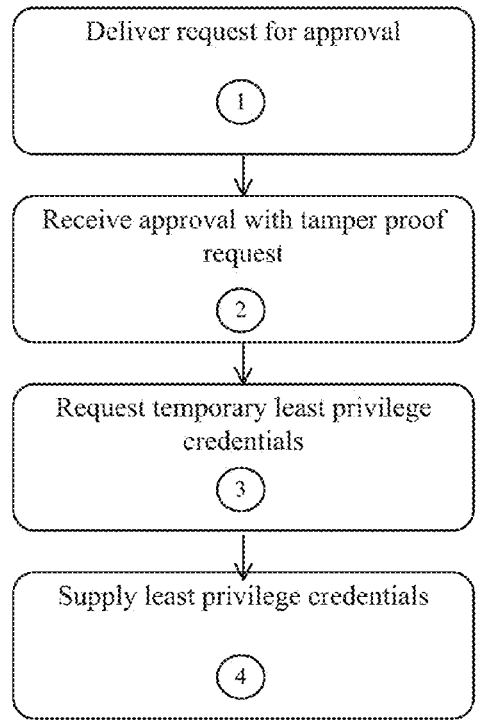

FIGS. 3A and 3B are block diagrama illustrating a method by which a cloud optimization system may obtain the necessary credentials to perform one or more changes to a cloud environment using a broker between the approval and security systems. In an embodiment of the invention, a requesting user at an Approval System 40 may use a mobile device application to interface with a Cloud Optimization System 10 to review a requested action. The requesting user may accept or deny the requested action to modify a cloud environment. In Step 1, a Cloud Optimization System 10 may submit a request to one or more approvers through a mobile device application. If the one or more approvers approve the requested action, in Step 2, the mobile device application may submit a secure request for credentials to Cloud Optimization System 10, where security may involve techniques known to one skilled in the art (for example, preventing eavesdropping and replay attacks). In Step 3, the Cloud Optimization System 10 may provide the tamper proof request to a Security System 50. The Security System 50 may interpret the tamper proof request. In an embodiment of the invention, for security reasons, the Cloud Optimization System 10 may not be capable of interpreting a request between the Approval System 40 and the Security System 50. The Cloud Optimization System 10 may only act as a trusted broker. In an embodiment of the invention, the brokering between the Approval System 40 and the Security System 50 may be done by an external system not depicted in this figure. In an embodiment of the invention, the Security System 50 may review the proposed request, the authenticity of both its requestor and broker, and its consistency with organization policies. If the request is correct, the Security System 50 may provision temporary least privilege credentials to perform the action proposed. In Step 4, the Security System 50 may supply the temporary least privilege credentials to the Cloud Optimization System 10.

In an embodiment of the invention, the Cloud Optimization System 10 may be characterized as a system that collects and stores data on the current state of a cloud-based environment having a policy engine capable of interpreting policies describing the desired states for one or more environments, a recommendation engine that can propose changes to an environment to make it consistent with the policies, and execution capability for executing these proposed changes upon receipt from outside the system of the necessary security authorization. The recommendation engine may utilize historical data collected from the cloud environment, as well as aggregate data from other cloud environments, to support producing accurate recommendations.

By combining a management system capable of interpreting a policy, a monitoring engine capable of monitoring a cloud environment for deviation from this policy, a recommendation engine capable of proposing a change to achieve a desired state based on a known policy, a workflow engine that can execute steps that gain approval for a proposed change by interfacing with humans or an automated system, and a security system capable of granting temporary authorization to execute a change, a system can ensure a cloud environment is always managed to a desired state. This system enables the automated orchestration of cloud environments to achieve defined business goals without losing the necessary human oversight for managing risk. This, in effect, constitutes a cloud operating system, capable of interfacing between a customer and the available cloud infrastructure services, in order to fulfill the driving vision of the cloud: to operate highly cost-effective, secure, available and performing infrastructure in support of business goals. This exchange constitutes a delegated action: the performance of an action by a computer system on behalf of human actors either through direct or indirect approval.

Figure 4:
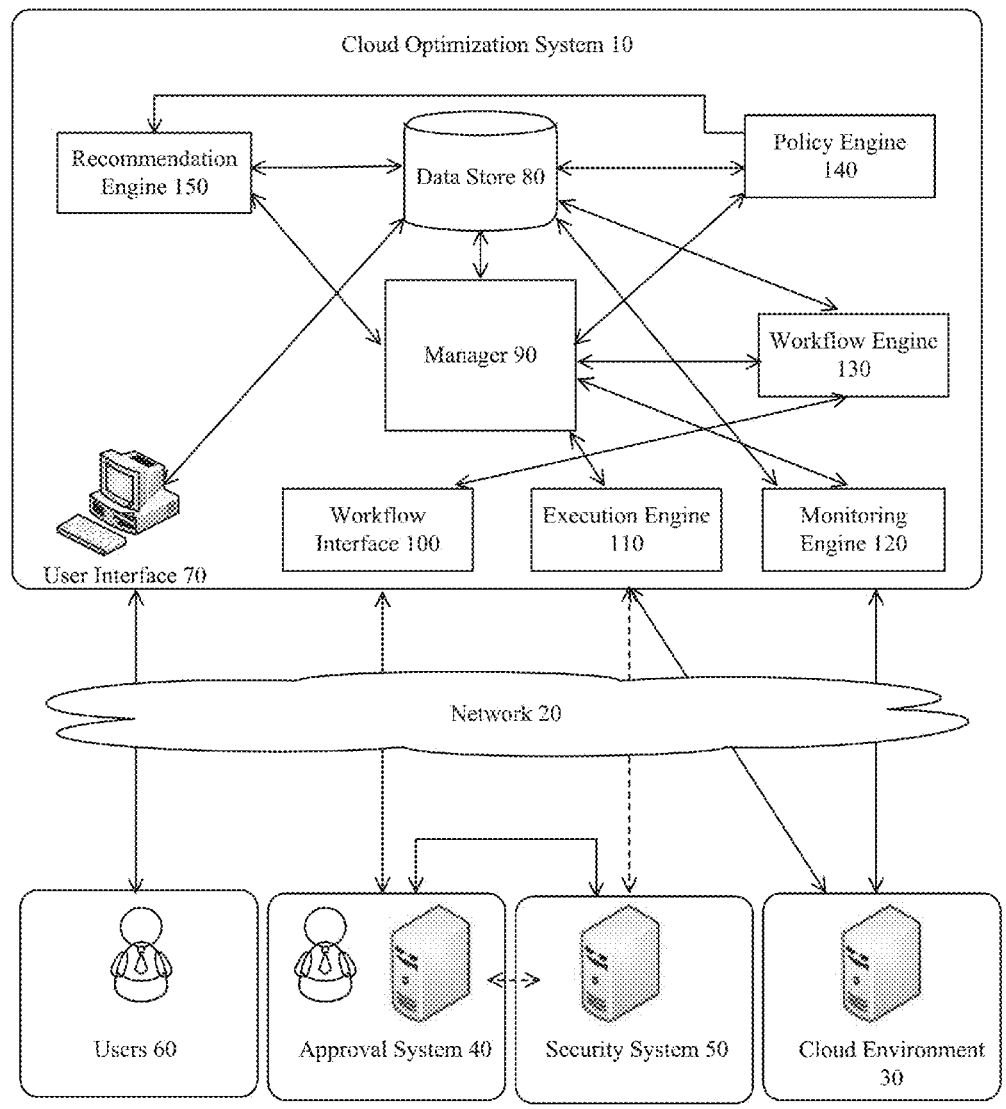
FIG. 4 is a block diagram illustrating a cloud optimization system in accordance with an embodiment of the invention.

FIG. 4 is a block diagram illustrating a cloud optimization system in accordance with an embodiment of the invention. Specifically, the cloud optimization system may identify and make a change to cloud environment. Users 60 may interface with a Cloud Optimization System 10 through User Interface 70 to define one or more policies by which a Cloud Environment 30 may be managed to an ideal state, as well as the necessary approval workflow required to receive permission to make modifications to that environment. User Interface 70 may be embodied by a web-based application, desktop application, mobile device application and any other human to computer interface known to one skilled in the art. The Cloud Optimization System 10 may be connected through a communication medium over a Network 20, such as the internet, an intranet, a local-area-network (LAN), a wide-area-network (WAN), etc., to a customer's Cloud Environment 30, Security System 50, Approval System 40, and Users 60. The user-defined policies and approval workflow are captured in a Data Store 80. The Data Store 80 may be a persistent store that could be embodied by a database, file system, cloud-based storage system, or any other mechanism for the storage of structured data available to one skilled in the art. A Monitoring Engine 120 may be continuously collecting data from the Cloud Environment 30. This data may include data from the provisioned cloud infrastructure, cloud services and supporting cloud systems. If the Cloud Environment 30 is managed by a third-party, such as a public cloud provider, the collected data may include pricing, performance, and availability of the cloud environment. A Manager 90 will orchestrate the flow of information throughout the subsystems of the Cloud Optimization System 10. The Manager 90 may interface with a Policy Engine 140 to determine if the Cloud Environment 30 has deviated from a desired state defined in one or more policies. It may be necessary in some cases for the Policy Engine 140 to interact with a Recommendation Engine 150 in order to determine whether or not a policy has been violated (for example, if a violation requires a specific deviation from a new desired state, if you can save more than 30% by making a change, etc.).

The decision as to whether or not to optimize will result from the satisfaction of a trigger condition that may be directly defined in a policy stored in the Data Store 80, or can be inferred from that policy. If the trigger condition has been met, the Manager 90 may interface with the Recommendation Engine 150 to determine the optimum change that may be made to return the Cloud Environment 30 back to a desired state. The recommendations may be produced using one or more constraint optimization algorithms that, given a known environment and constraints, may produce a proposed new optimal state. The Manager 90 may then request the execution of the user-defined workflow to receive approval from an Approval System 40 for making the proposed change. The Approval System 40 may include an embodiment that has human actors, is an automated computer system, or combines both human actors and an automated computer system. A Workflow Engine 130 may interface with the Approval System 40 through a Workflow Interface 100. Workflow Interface 100 can be embodied by either a human to computer interface (for example, a mobile application, a web application, etc.) or an automated system. Upon receipt of approval from the Approval System 40, the Cloud Optimization System 10 may need to acquire least privilege credentials to perform the requested action. The requirement for obtaining credentials may be driven from a desire to limit the Cloud Optimization System 10 to a high level of security by not entrusting it to operate with the set of privileges required to affect all potential changes to the Cloud Environment 30 based on the user-defined policies. The necessary credentials may come from either the Approval System 40 interacting directly with the Security System 50, the Cloud Optimization System 10 brokering between the Approval System 40 and the Security System 50, or by direct interaction between the Cloud Optimization System 10 and the Security System 50. Upon receipt of the necessary credentials to perform the requested action, the Manager 90 may direct the Execution Engine 110 to perform the proposed change to the Cloud Environment 30. The results of the change may be communicated back to the Approval System 40, and may be stored by the Manager 90 for audit and reporting purposes in the Data Store 80. The interface between all sub-systems (i.e., engines) within the Cloud Optimization System 10 may occur within a single computer system, or require the interface of more than one computer system across a computer network. In an embodiment of the invention, the Security System 50 is located within the Cloud Optimization System 10.

In an embodiment of the invention, a user of the Cloud Environment 30 may be able to make a prepayment for an agreed upon term with a cloud provider in order to receive a discounted price for the use of the Cloud Environment 30. Organizations that take advantage of capacity reservations typically gather data, perform a manual analysis of this data to decide what capacity to reserve, and then reserve this capacity through a programmatic or human interaction. This process is labor intensive and requires a substantial distraction of multiple people across an organization to make and execute the decision. Through the use of the Cloud Optimization System 10, an organization may define a policy for purchasing reserved capacity, and have the system manage to this policy. A sample policy may be as follows:

> Within an annual budget of $500,000, make capacity reservations no more than once per month, with a single purchase not to exceed $200,000 in a given calendar quarter, that achieves no less than a 40% cost benefit over non-reserved usage, and makes a term commitment not to exceed 12 months. All proposed purchases must go through a two level approval chain that includes the director of operations and the CFO. Temporary authorization to execute a recommendation should be provided by the on-call system administrator.

In an embodiment of the invention, the Cloud Environment 30 may allow for the programmatic modification of the system configuration of security elements. This may include the firewall rules for accessing a network, the communication between different networks, and the assignment of IP addresses to virtual devices on the network. Many organizations define a policy or reference architecture for how they expect their security to be configured for specific collections of cloud infrastructure. A sample policy may be:

> The public facing web servers for a corporate website are designed to be behind a cloud-based load balancer service. The load balancer should expose only ports 80 (HTTP) and 443 (HTTPS). All HTTPS traffic should terminate at the load balancer, before being passed on to servers in the load balancer. These servers should not be otherwise accessible to the public network and expose only TCP port 80 (HTTP). Any deviation from this policy should be corrected immediately after receiving approval from the Chief Security Officer (CSO), or from the CIO in the event the security officer does not respond within 30 minutes of an approval request. The temporary authorization to perform the request should be provided by the organization's internal security system.

Some organizations may utilize more than one public cloud provider for cost efficiencies, redundancy, performance optimization, or to leverage provider-specific services. In an embodiment, an organization may be running an analytics workload that is configured to work across one of three cloud providers. Their policy for managing the usage of cloud providers for this workload may be as follows:

> The analytics workload should be executed in one of our approved cloud providers at the most cost effective rate. The workload requires provisioning of two virtual cores of compute, 8 gigabytes (GB) of memory and 1 terabyte (TB) of disk space. All necessary access has been configured across all available clouds. A single virtual instance should be capable of processing on average 100,000 analytics jobs per day. The workload should be evaluated for cost optimization no more than once a day. If it is possible to achieve a more than 10% savings per job executed in another cloud, the workload should be migrated to the alternative cloud. A two-level approval is required from the director of operations and then the vice president of engineering. Temporary credentials to perform the move will be provided manually by the director of operations after approval.

Figure 5:
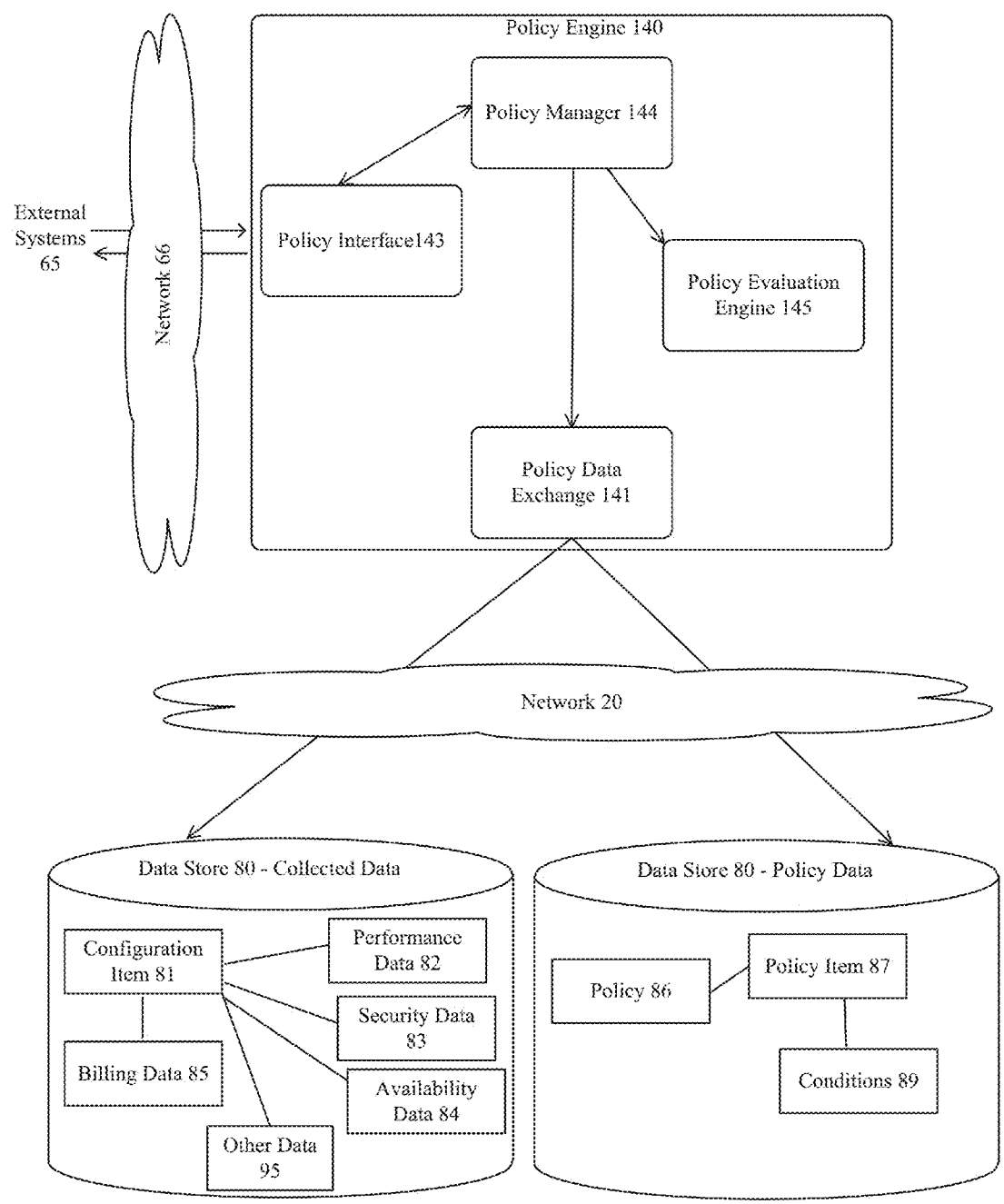
FIG. 5 is a block diagram illustrating a cloud optimization system in accordance with an embodiment of the invention.

FIG. 5 is a block diagram illustrating a cloud optimization system in accordance with an embodiment of the invention. Specifically, FIG. 5 illustrates a Policy Engine 140 that may identify whether a change should be made to a cloud environment to achieve a more desired state. The Policy Engine 140 may comprise the following components: a Policy Manager 144, a Policy Interface 143, a Policy Evaluation Engine 145, and a Policy Data Exchange 141. In an embodiment of the invention, the decision whether or not to evaluate a policy may be driven by the Policy Manager 144. For example, the decision whether or not to evaluate a policy may be driven by an external synchronous or asynchronous request to the Policy Interface 143. To evaluate a policy, the Policy Manager 144 may interface with the Policy Data Exchange 141 to collect the necessary policy data.

Policy Data Exchange 141 may be connected to one or more Data Stores 80 via a Network 20, such as the internet, an intranet, a local-area-network (LAN), a wide-area-network (WAN), etc. In an embodiment of the invention, a policy may be stored in a Data Store 80. The policy may be decomposed into multiple parts. For example, Policy 86 represents the overall structure containing one or more rules that capture the policy. The one or more rules may be captured in a Policy Item 87 as a series of one or more Conditions 89. The policy information retained in the Data Store 80 may be retrieved on-demand, or may reside in memory for use by the Policy Engine 140. The Policy Manager 144 may also retrieve any supporting data required to evaluate Policy 86 and its corresponding Policy Items 87. This data may include cost, performance, configuration, availability and security information about the resources that could be affected by this policy.

In an embodiment of the invention, the policy information may contain a Configuration Item 81 that may capture information about one or more resources or assets in an environment. It may also contain Performance Data 82, Security Data 83, Availability Data 84 and Billing Data 85 for these resources. It may also include Other Data 95 that is independent of the Configuration Item 81. Examples of Other Data 95 include, but are not limited to, pricing, performance and availability data from a cloud provider. Data may be returned to the Policy Manager 144 where it may be provided to the Policy Evaluation Engine 145 for evaluation. The Policy Evaluation Engine 145 may interpret the policy and its supporting data to determine whether or not the policy has been violated. A policy violation determination may be returned to one or more external systems through the Policy Interface 143. In an embodiment of the invention, the Policy Manager 144 may interact with one or more External Systems 65 via a Network 66, such as the internet, an intranet, a local-area-network (LAN), a wide-area-network (WAN), etc. In an embodiment of the invention, an External System 65 may be a recommendation engine to fulfill its evaluation of a policy. For example, if the policy for "cost optimization" states that a change should only be made if a specific cost target can be achieved, a recommendation may be produced to determine the achievability of that cost target. The Policy Engine 140 and Data Store 80 may reside on a single computer system or reside on multiple computer systems that communicate over a computer network. In an embodiment of the invention, the Network 20 and Network 66 are the same network. In an embodiment of the invention, the Network 20 and Network 66 are different networks.

Figure 6:
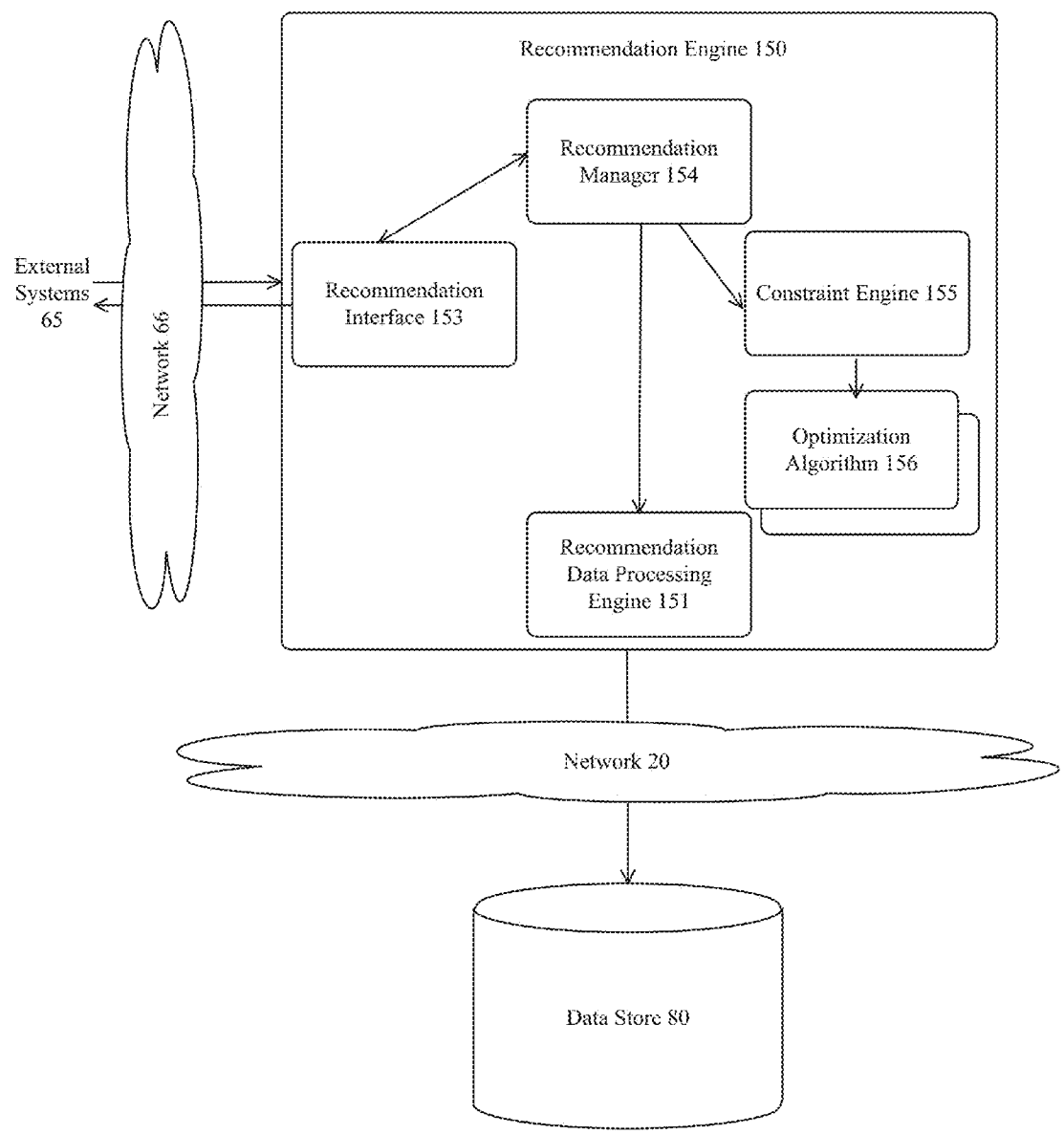
FIG. 6 is a block diagram illustrating a cloud optimization system in accordance with an embodiment of the invention.

FIG. 6 is a block diagram illustrating a cloud optimization system in accordance with an embodiment of the invention. Specifically, FIG. 6 illustrates a Recommendation Engine 150 that may produce an optimum recommended change to a cloud environment consistent with one or more user-defined policies. In an embodiment of the invention, a request for a proposal may come either from an external request through a Recommendation Interface 153 or from a decision driven by a Recommendation Manager 154. In order to identify an ideal state, the Recommendation Manager 154 may interface with a Data Store 80 through Recommendation Data Processing Engine 151 via a Network 20, such as the internet, an intranet, a local-area-network (LAN), a wide-area-network (WAN), etc. The Recommendation Data Processing Engine 151 may be responsible for collecting the cloud environment data required to make an evaluation. The cloud environment data may include, but is not limited to, the following: cost, performance, security, availability, and configuration data for the cloud infrastructure. The cloud environment data may also include the supporting cloud environment in which the cloud infrastructure is operating. The cloud environment data may be delivered to a Constraint Engine 155. The Constraint Engine 155 may be capable of executing one or more Optimization Algorithms 156 on the data to identify one or more optimum changes required to take the cloud environment from its current state to a new recommended state. The Optimization Algorithm 156 may include proprietary algorithms, or published algorithms known to one skilled in the art (for example, a greedy approximation algorithm). The resulting recommendation may be communicated to one or more External Systems 65 through the Recommendation Interface 153 via a Network 66, such as the internet, an intranet, a local-area-network (LAN), a wide-area-network (WAN), etc. In an embodiment of the invention, the Network 20 and Network 66 are the same network. In an embodiment of the invention, the Network 20 and Network 66 are different networks. The Recommendation Engine 150 and the Data Store 80 may reside on a single computer system or reside on multiple computer systems that communicate over a computer network.

Figure 7:
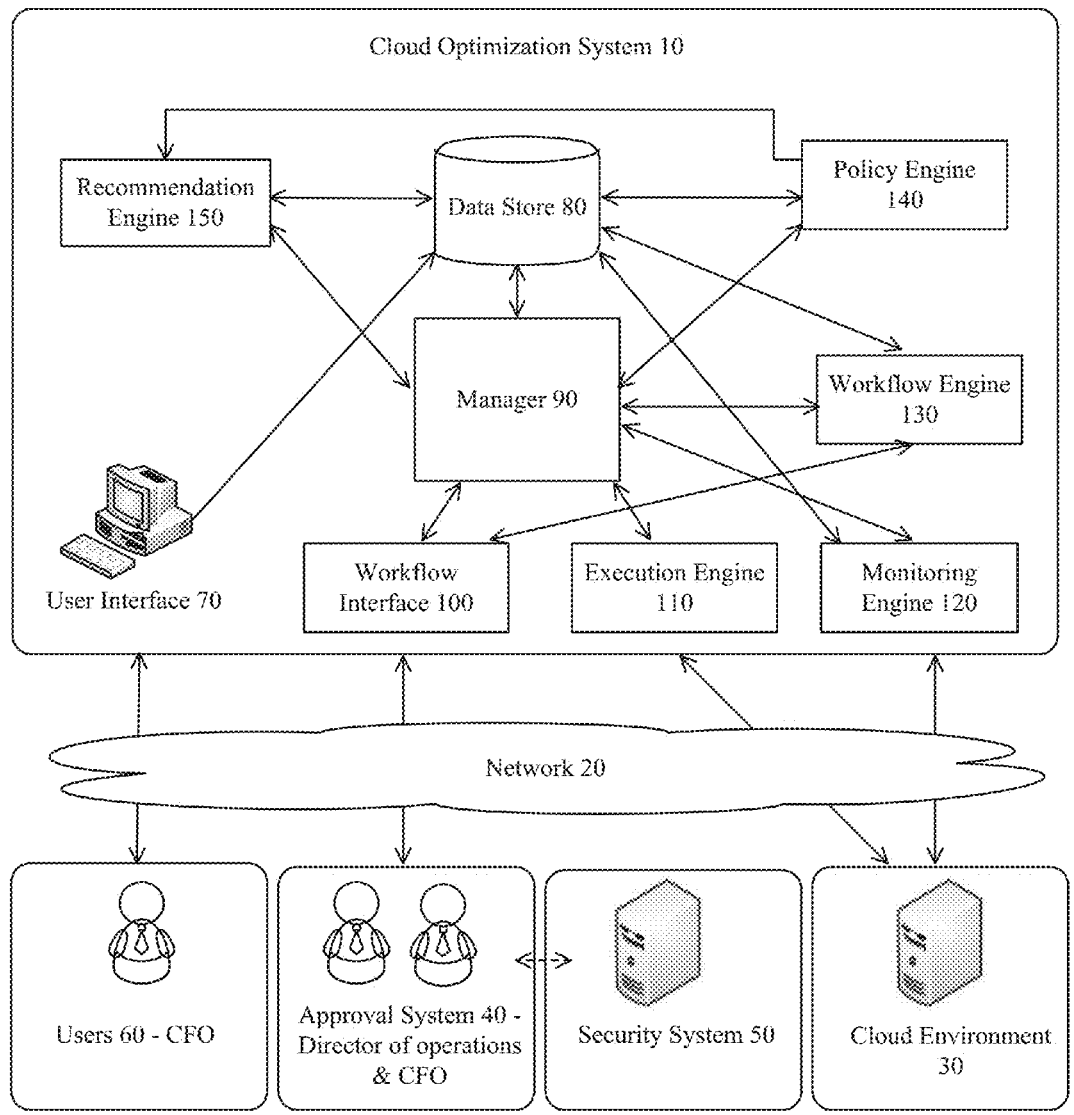
FIG. 7 is a block diagram illustrating a method for operation of a cloud optimization system in accordance with an embodiment of the invention.

FIG. 7 is a block diagram illustrating a method for operating a cloud optimization system in accordance with an embodiment of the invention. Specifically, a Cloud Optimization System 10 may monitor for and take action based on a reservation purchase policy. In an embodiment of the invention, the Cloud Optimization System 10 may receive a policy from a user through a web-based application that is denoted through User Interface 70. This policy may be stored in a Data Store 80 for use by the Cloud Optimization System 10. A Monitoring Engine 120 may continuously gather data on the current usage of cloud infrastructure and pricing from the cloud provider, which may be stored in the Data Store 80. This data may include the history of previous reservation purchases, which may be required to evaluate the policy. The Manager 90 may periodically ask a Policy Engine 140 to evaluate its policies to determine whether a violation has occurred that would necessitate a change to the Cloud Environment 30. If a policy has been violated (for example, there exists usage that can be optimized through the purchase of reserved capacity and no other purchases have been performed during the current quarter), the Manager 90 may request a recommendation from a Recommendation Engine 150. In an embodiment of the invention, a recommendation may be the following:

Make a $180,000 purchase of 10 big instance types in region US-East for heavy use, 10 big in US-West for medium use, 40 medium instance types in US-West for heavy use, and 80 small instance types in EU-West for light use. All reservations will be a term of one year.

Once the Manager 90 has a recommendation, it may interact with a Workflow Engine 130, to seek approval via a Workflow Interface 100 from one or more users. Approval may be received via an electronic medium, such as, email, a mobile device application, electronic notification, automated voice call, FAX or other options known to one skilled in the art. For example, the Manager 90 may interact with the Workflow Interface 130 to seek approval through an electronic medium (for example, email, text, instant message, etc.) via the Workflow Interface 100 first from an operations manager and then the CFO for the organization. The approval may also be automated through a system.

Figure 8:
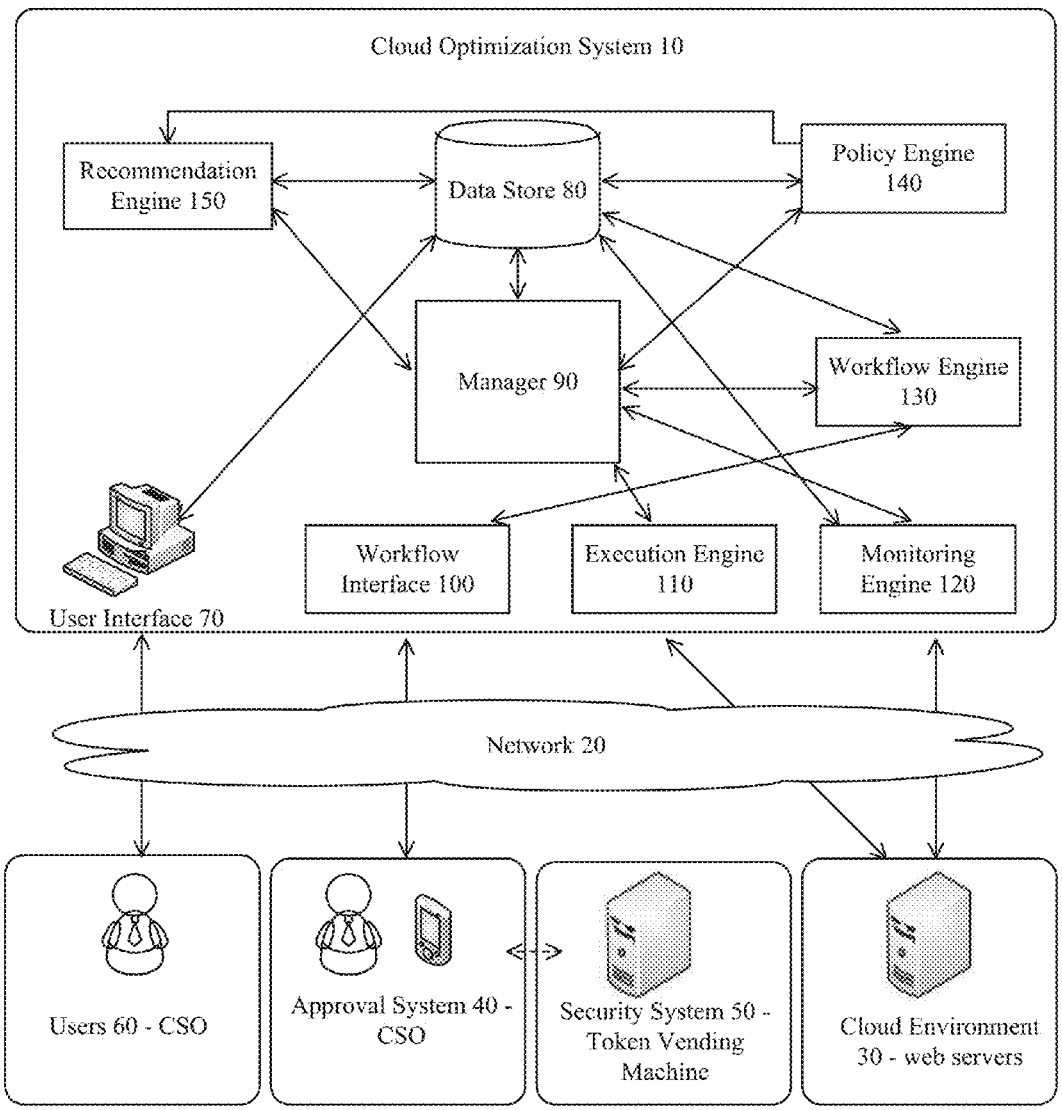
FIG. 8 is a block diagram illustrating a method of operation of a cloud optimization system in accordance with an embodiment of the invention.

For example, if a request to purchase is received from a trusted system for less than $5,000 and has been approved by a Director or above, the request may be automatically approved. The director of operations may provision temporary credentials from the Security System 50, which he/she supplies to the Cloud Optimization System 10 through the Workflow Interface 100. The Manager 90 may then supply the provided credentials to an Execution Engine 110 to perform the purchase of a reserved capacity from the cloud provider, consistent with the recommendation. FIG. 8 is a block diagram illustrating a method of operation of a cloud optimization system in accordance with an embodiment of the invention. Specifically, a Cloud Optimization System 10 may monitor for and take action based on one or more security policies. A security policy may be provided to the Cloud Optimization System 10 by User 60 (for example, the Chief Security Officer) via a web application shown as User Interface 70. A public facing web server, which may comprise a load balancer, one or more servers, and their security configuration, are shown as Cloud Environment 30. The Cloud Optimization System 10 may actively monitor the Cloud Environment 30 through a Monitoring Engine 120, via a Network 20, such as the internet, an intranet, a local-area-network (LAN), a wide-area-network (WAN), etc. The Monitoring Engine 120 may collect and store in a Data Store 80, information such as the current configuration and security settings for all resources comprising the public website. The Monitoring Engine 120 may also collect and store in the Data Store, data from other supporting systems, such as an Intrusion Detection Service (IDS) or a log monitoring system. The collected data may get evaluated, either at the direction of the Manager 90 or on-demand at the time of collection, to determine if the security policy has been violated. The evaluation of policy may be performed by a Policy Engine 140. A sample violation of policy might as follows:

An operations engineer while making changes to web server virtual instances, inadvertently changed the network routes to allow public traffic to directly access the web servers in the load balancer. A likely action to be recommended is to remove routes that impact the web servers.

In an embodiment of the invention, upon the direction of Manager 90, a Recommendation Engine 150 may recommend the deletion of two routes that are allowing external internet traffic to directly reach the web servers based on the above policy. The recommendation may be delivered to the Chief Security Officer (CSO) via a mobile application running on his/her phone, which may allow the CSO to review and then either accept or deny any of the proposed changes. If approved, the mobile application may negotiate temporary least privilege credentials from a Security System 50, which in this embodiment is implemented as a security token vending machine, known to one skilled in the art. The token vending machine may return credentials, which may be supplied by the CSO's mobile application back to the Cloud Optimization System 10, where they may be executed in the Cloud Environment 30 by the Cloud Optimization System's Execution Engine 110. The completion of this change may be then communicated back to the CSO through his/her mobile application.

Figure 9:
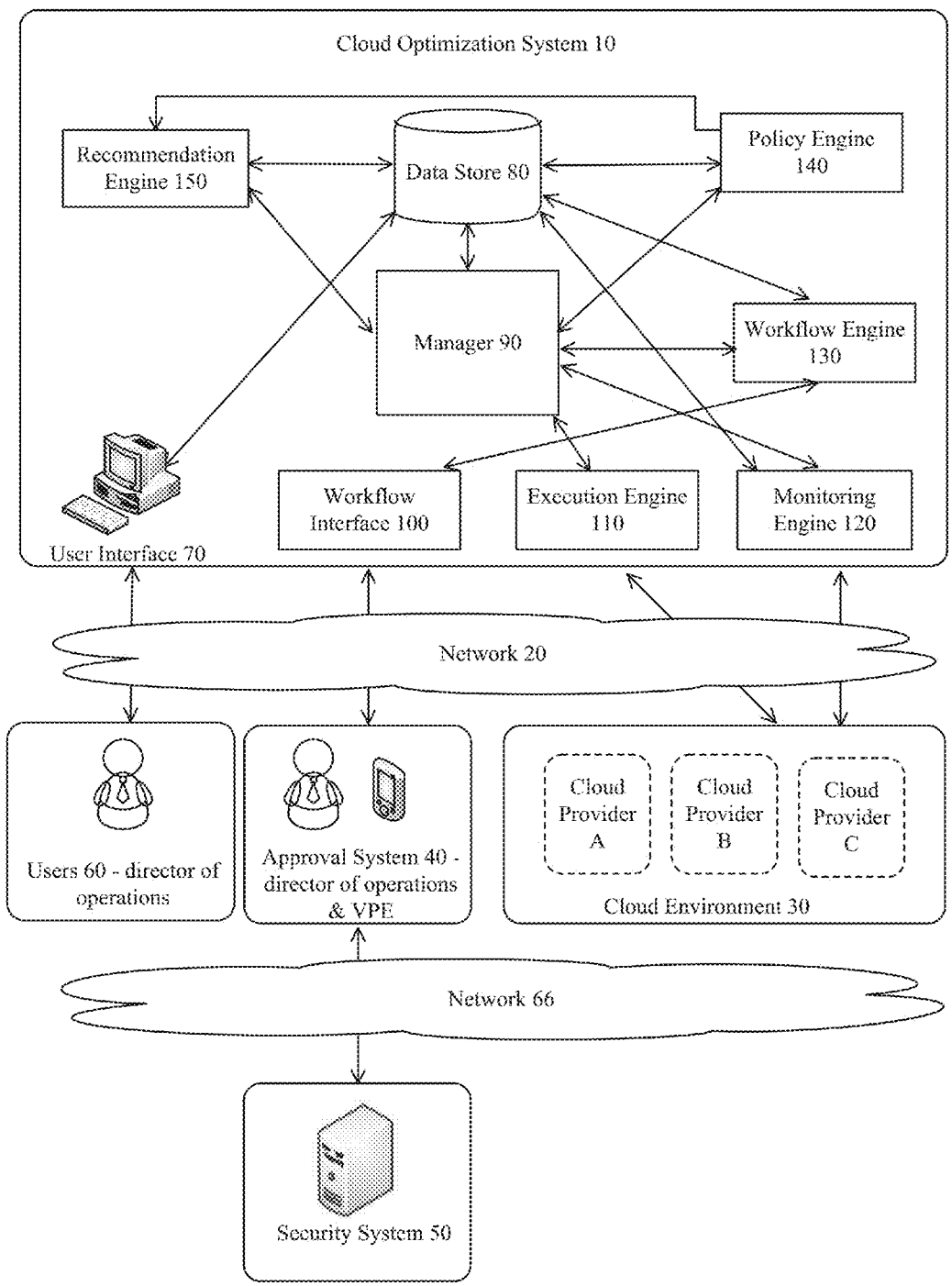
FIG. 9 is a block diagram illustrating a method of operation of a cloud optimization system in accordance with an embodiment of the invention.

FIG. 9 is a block diagram illustrating a method of operation of a cloud optimization system. Specifically, a Cloud Optimization System 10 may move a workload from one cloud provider to another (shown as Cloud Provider A, Cloud Provider B, and Cloud Provider C) in order to optimize costs and performance. To execute this policy, the Cloud Optimization System 10 may be aware of the architecture of the Cloud Infrastructure. For example, the Cloud Optimization System 10 may be aware of all the virtual instances running the analytics workload, their performance characteristics, and the number of jobs they have processed down to an hourly basis. The Cloud Optimization System 10 may also be aware of the approved cloud providers and their properties (for example, their current pricing). The Cloud Optimization System 10 may formulate this awareness by collecting data from different cloud providers (denoted as Cloud Environment 30) through a Monitoring Engine 120. When the Manager 90 identifies, through a Policy Engine 140, that a trigger condition has been identified (for example, if we can save more than 10% by moving the workload to one of three available and configured clouds and no other move has been executed in the last day), a recommendation may be requested of a Recommendation Engine 150 (for example, move analytics workload from cloud provider A to C). The recommendation in this embodiment may be delivered to one or more users (for example, the mobile phones of the director of operations and the VP of engineering via a mobile application). Upon approval, the mobile application may provision temporary least privilege credentials from a Security System 50 via a Network 66, such as the internet, an intranet, a local-area-network (LAN), a wide-area-network (WAN), etc., that it may provide to the Cloud Optimization System 10 for execution in the Cloud Environment 30. The move may then be executed via an Execution Engine 110 and the result may be communicated through the mobile application to all approvers. In an embodiment of the invention, the Network 20 and Network 66 are the same network. In an embodiment of the invention, the Network 20 and Network 66 are different networks.

In an embodiment of the invention, the Cloud Optimization System 10 may generate one or more recommendations to adjust reserved capacity for optimization of costs by adjusting the original request at time of purchase. In an embodiment of the invention, the Cloud Optimization System 10 may generate one or more recommendations to move stored data to different storage mediums. The storage mediums may have different characteristics, including price, performance and durability. In an embodiment of the invention, the Cloud Optimization System 10 may automate the shutdown of the cloud infrastructure by defining a policy for what constitutes a lack of use, and managing the shutdown of the cloud infrastructure when the policy conditions are met. In an embodiment of the invention, the Cloud Optimization System 10 may rightsize a workload upon identifying that a workload has been provisioned with excess or insufficient resources. The Cloud Optimization System 10 may define a corrective action and seek approval for executing it. The Cloud Optimization System 10 may increase redundancy of one or more workloads by understanding a policy for managing resource availability (for example, multi-region active-active nodes), identifying risks, and proposing and/or executing corrective action(s). In an embodiment of the invention, the Cloud Optimization System 10 may maintain close adherence to metadata policies that are associated with one or more cloud infrastructure resources. The annotation may be policy driven and allow better traceability. The Cloud Optimization System 10 may understand the policy, monitor the cloud infrastructure resources for deviation from the policy, and propose corrective action.

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ 7 operating system, Microsoft Windows™ 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, C#, ASP .NET, COBOL, dBase, Forth, Fortran, Java, J2EE, Modula-2, Pascal, Prolog, RUM Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A computer-implemented method for optimizing cloud environment through delegated actions using a cloud infrastructure optimization system, including at least a computer processor and a memory, the memory storing at least one data module, the method comprising the steps of:
   gathering data representing operating conditions of a cloud environment using a monitoring system executing at the computer processor, which is operatively connected to the cloud environment over a network;
   determining a current state of the operating conditions of the cloud environment;
   storing, at the memory, at least one policy representing user desired operation of the cloud environment, and at least one user-defined policy to authorize a change to the cloud environment;
   evaluating, using a policy engine executing at the computer processor, whether the cloud environment should be changed to achieve a more desired state based on the current state of the operating conditions and the at least one policy set representing user desired operation of the cloud environment and the at least one user-defined policy to authorize a change to the operating conditions of the cloud environment;
   based on the evaluation, generating, using a recommendation engine executing at the computer processor, a recommended change to the operating conditions of the cloud environment to achieve at least one desired state consistent with the at least one user-defined policy;
   transmitting the recommended change to the cloud environment for changing the cloud environment from the current state to the desired state;
   performing at least one change to the cloud environment consistent with the recommended change; and
   determining at least one result of the at least one change to the cloud environment consistent with the at least one recommended change.

2. The method of claim 1, further comprising the steps of:
   monitoring the cloud environment by the monitoring system for deviation from the at least one user-defined policy;
   determining whether a user-defined threshold is met;
   making at least one recommended action for changing the cloud environment to achieve the at least one desired state.

3. The method of claim 1, wherein the at least one user-defined policy defines at least one objective.

4. The computer-implemented automated and policy-driven method of claim 3, wherein the at least one objective is at least one of the following:
   lower cost; increased availability; better performance; and higher security.

5. The method of claim 2, wherein the at least one recommended action, if executed, will bring the respective aspects of the cloud environment closer to compliance with the at least one user-defined policy.

6. The method of claim 2, further comprising the step of: delivering at least one recommended action to at least one approver based on at least one predefined approval policy.

7. The method of claim 6, further comprising the step of: interfacing with at least one security system to receive at least one temporary credential to authorize execution of the approved at least one recommended action.

8. The method of claim 1, further comprising the step of: communicating the at least one result to at least one user.

9. The method of claim 1, further comprising the step of: managing the cloud environment optimization system by at least one third party agent.

10. The method of claim 1, further comprising the step of: migrating at least one workload between at least two cloud service providers to achieve at least one desired state consistent with the at least one user-defined policy.

11. The method of claim 6, wherein the at least one predefined approval policy dynamically adjusts based on the recommended action.

12. A computer-implemented cloud infrastructure optimization system including at least a computer processor and a memory, the system operable to optimize a cloud environment through delegated actions, the system comprising:
a monitoring system for gathering data from a cloud environment executing at the computer processor which is operatively connected to a cloud environment over a network representing operating conditions of the cloud environment to determine the current state of the operating conditions of the cloud environment;
a policy database, maintained at the memory, storing at least one policy representing user desired operation of the cloud environment, and at least one user-defined policy to authorize a change to the cloud environment;
a policy engine executing at the computer processor operable to evaluate whether the cloud environment should be changed to achieve a more desired state based on the current state of the operating conditions and the at least one policy set representing user-desired operation of the cloud environment and the at least one user-defined policy to authorize a change to the operating conditions of the cloud environment;
a recommendation engine executing at the computer processor for generating, based on the evaluation, a recommended change to the operating conditions of the cloud environment to achieve at least one desired state consistent with the at least one user-defined policy,
wherein the recommended change is transmitted to the cloud environment for changing the cloud environment from the current state to the desired state; and
a performance engine to perform at least one change to the cloud environment consistent with the recommended change,
wherein the monitoring system determines at least one result of the at least one change to the could environment with the at least one recommended change.

13. The system of claim 12, further comprising:
a monitoring engine executing at the computer processor for monitoring the cloud environment's deviation from the at least one user-defined policy;
a determination engine executing at the computer processor for determining whether a user-defined threshold is met; and
wherein the recommendation engine producing at least one recommended change to the cloud environment achieves the at least one desired state.

14. The system of claim 12, wherein the at least one user-defined policy defines at least one objective.

15. The system of claim 14, wherein the at least one objective is at least one of the following: lower cost; increased availability; better performance; and higher security.

16. The system of claim 13, wherein the recommended change brings the cloud environment into compliance with the at least one user-defined policy.

17. The system of claim 13, further comprising:
a delivery engine for delivering the at least one recommended action to at least one approver based on at least one predefined approval process.

18. The system of claim 13, further comprising:
an interface for interfacing with at least one security system to receive at least one temporary credential to authorize execution of the approved at least one recommended action.

19. The system of claim 13, further comprising:
a third-party management engine for managing the cloud infrastructure optimization system by at least one third-party agent.

20. The system of claim 13, further comprising:
a migration engine for migrating at least one workload between at least two cloud service providers to achieve the user-defined policy.

* * * * *